United States Patent
Francini et al.

(10) Patent No.: US 7,148,184 B2
(45) Date of Patent: *Dec. 12, 2006

(54) SELF-DIVERTING FOAMED SYSTEM

(75) Inventors: Pia-Angela Francini, Houston, TX (US); Keng Chan, Sugar Land, TX (US); Mark Brady, Sugar Land, TX (US); Christopher Fredd, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 332 days.

This patent is subject to a terminal disclaimer.

(21) Appl. No.: 10/649,055

(22) Filed: Aug. 27, 2003

(65) Prior Publication Data

US 2005/0020454 A1     Jan. 27, 2005

Related U.S. Application Data

(60) Provisional application No. 60/489,079, filed on Jul. 22, 2003.

(51) Int. Cl.
*C09K 8/78* (2006.01)
*E21B 43/16* (2006.01)

(52) U.S. Cl. ............ 507/241; 507/260; 507/267; 507/277; 507/933; 166/300; 166/307

(58) Field of Classification Search .......... 507/241, 507/260, 267, 277, 933; 166/300, 307
See application file for complete search history.

(56) References Cited

U.S. PATENT DOCUMENTS

| | | | |
|---|---|---|---|
| 3,724,549 A | 4/1973 | Walter | 166/282 |
| 4,324,669 A | 4/1982 | Norman et al. | 252/8.55 |
| 4,591,447 A | 5/1986 | Kubala | 252/8.55 |
| 4,695,389 A | 9/1987 | Kubala | 252/8.553 |
| 4,807,703 A | 2/1989 | Jennings, Jr. | 166/307 |
| 5,979,557 A * | 11/1999 | Card et al. | 166/300 |
| 6,035,936 A | 3/2000 | Whalen | 166/308 |
| 6,148,917 A | 11/2000 | Brookey et al. | 166/301 |
| 6,248,699 B1 * | 6/2001 | Subramanian et al. | 507/265 |
| 6,258,859 B1 | 7/2001 | Dahayanake et al. | 516/77 |
| 6,306,800 B1 | 10/2001 | Samuel et al. | 507/129 |
| 6,367,548 B1 | 4/2002 | Purvis et al. | 166/281 |
| 6,399,546 B1 | 6/2002 | Chang et al. | 507/240 |

(Continued)

FOREIGN PATENT DOCUMENTS

CA     1109356     9/1981

(Continued)

OTHER PUBLICATIONS

SPE 56529 Case Study of a Novel Acid-Diversion Technique in Carbonate Reservoirs. F.F.Chang, T.Love, C.J.Affeld, J.B.Blevins III, R.L. Thomas, and D.K.Fu., Feb. 1998.

(Continued)

*Primary Examiner*—Philip C. Tucker
(74) *Attorney, Agent, or Firm*—Thomas O. Mitchell; Tim Curington; Robin Nava

(57) ABSTRACT

A method is given for diverting acids in matrix acidizing and acid fracturing. The acids are diverted with a diverting agent that is an energized or foamed acidic viscoelastic surfactant system that contains a viscoelastic surfactant that gels and increases in viscosity when the acid in the foamed acidic viscoelastic surfactant system is spent. The method provides a synergistic combination of the diverting capabilities of foams and the diverting capabilities of viscoelastic gel systems. The resistance to flow of the gelled foamed viscoelastic surfactant system is greater than expected from a foam or a viscoelastic gel system alone.

17 Claims, 2 Drawing Sheets

U.S. PATENT DOCUMENTS

| | | | |
|---|---|---|---|
| 6,435,277 B1 * | 8/2002 | Qu et al. | 166/281 |
| 6,482,866 B1 | 11/2002 | Dahayanake et al. | 516/77 |
| 6,497,290 B1 | 12/2002 | Misselbrook et al. | 166/384 |
| 6,569,814 B1 | 5/2003 | Brady et al. | 507/201 |
| 6,605,570 B1 | 8/2003 | Miller et al. | 507/211 |
| 6,637,517 B1 * | 10/2003 | Samuel et al. | 166/381 |
| 6,667,280 B1 | 12/2003 | Chang et al. | 507/240 |
| 6,703,352 B1 | 3/2004 | Dahayanake et al. | 507/241 |
| 6,929,070 B1 * | 8/2005 | Fu et al. | 166/308.2 |
| 2002/0004464 A1 | 1/2002 | Nelson et al. | 507/200 |
| 2002/0023752 A1 | 2/2002 | Qu et al. | 166/308 |
| 2002/0033260 A1 | 3/2002 | Lungwitz et al. | 166/278 |
| 2002/0147114 A1 | 10/2002 | Dobson, Sr. et al. | 507/242 |
| 2003/0019627 A1 * | 1/2003 | Qu et al. | 166/281 |
| 2003/0119680 A1 | 6/2003 | Chang et al. | 507/200 |
| 2003/0134751 A1 | 7/2003 | Lee et al. | 507/200 |
| 2003/0139298 A1 | 7/2003 | Fu et al. | 507/200 |
| 2004/0009880 A1 | 1/2004 | Fu et al. | 507/200 |
| 2004/0152604 A1 * | 8/2004 | Qu et al. | 507/200 |
| 2004/0176478 A1 | 9/2004 | Dahayanake et al. | 516/77 |
| 2005/0067165 A1 | 3/2005 | Cawiezel et al. | 166/307 |
| 2005/0107265 A1 | 5/2005 | Sullivan et al. | 507/271 |

FOREIGN PATENT DOCUMENTS

| | | |
|---|---|---|
| GB | 2012837 | 8/1979 |
| GB | 2354541 | 8/2001 |
| GB | 2372058 | 8/2002 |
| WO | 01/29369 | 4/2001 |
| WO | 03/054352 | 7/2003 |
| WO | 03/093641 | 11/2003 |

OTHER PUBLICATIONS

SPE 80274—*Application of Novel Diversion Acidizing Techniques to Improve Gas Production in Heterogeneous Formation.* By Xugang Wang, Honglan Zou, Jun Tian, Fuxiang Zhang, Xingsheng Cheng and Suzhen Li., Feb. 2003.

U.S. Appl. No. 10/370,633, titled, "Self-Diverting Pre-Flush Acid for Sandstone".

* cited by examiner

SELF-DIVERTING FOAMED SYSTEM

CROSS-REFERENCE TO RELATED APPLICATIONS

This application claims the benefit of U.S. Provisional Patent Application No. 60/489,079 filed on Jul. 22, 2003.

BACKGROUND OF THE INVENTION

This invention relates to stimulation of subterranean wells. More particularly it relates to matrix stimulation by acidizing and to acid fracturing. Most particularly it relates to a new method of diverting injected acids to improve zonal coverage.

Acidizing is a method in which an acidic fluid or a reactive fluid is contacted with a subterranean formation (the "matrix") penetrated by a wellbore. The acidizing fluid contacts and dissolves wellbore damage and/or part of the matrix. If the treatment is applied above the fracturing pressure, the injected fluid fractures the rock and the principle function of the acidic fluid is to create wormholes and/or to differentially etch the opposing faces of the fracture so that when the fracture closes when the injection pressure is released, the faces no longer match up and flow paths remain running along the fracture faces from the fracture tip to the wellbore to conduct formation fluid into the wellbore for production. It is important that the injected fluid should reach all of the target zone for maximum beneficial effect. This is difficult to achieve because of a natural tendency of the acid to react with the first reactive formation rock with which it comes into contact (because it is nearest to the wellbore or because it is the most porous or because it is the most accessible due to natural fractures or vugs) in either matrix acidizing or acid fracturing. Depending upon the heterogeneity of the rock, the reaction rate of the acid with the rock, and the rate at which fresh acid is delivered to the rock, the acid reaction may be relatively uniform, may form one or a few long wormholes extending into the rock, or may form a network of many smaller wormholes extending into the rock. All of this is well known to those of experience in the art. Attempts to achieve complete contact of acid with an entire rock formation zone (termed zonal coverage) involve diversion of acid from the regions first contacted to new regions. This is because otherwise the acid will tend to continue to react with the first rock with which it comes into contact, especially because it will have formed preferential flow pathways for subsequently injected acid. Diversion is also necessary when the formation is made up of strata having different permeabilities. When there is a permeability contrast, the initially injected acid will tend to enter the most permeable layer or layers first and in fact increase their permeability further, and then will continue to enter those layers. Diversion will correct this problem.

Zonal coverage may be achieved either by applying a mechanical method such as injection through coiled tubing with portions of the target formation successively isolated with packers, or by placing a fluid (such as a gel or a foam) or an additive (such as a salt) after treatment of a zone or part of a zone, which impedes fluid flow into the treated zone and diverts the acid or reactive fluid from the treated zone to a new (not yet treated) zone.

Foamed fluids have been shown to be able to block a formation not just by their viscosity but also by the mechanism of breaking and reforming under dynamic flow conditions. Furthermore, foamed fluids will block a formation more effectively the greater the bubble size in the foam relative to the pore size. When there is stratification (layers of varying permeability), diversion is achieved by generating and maintaining a stable foam in the higher permeability zone or zones during the entire treatment. When there is a long zone to be treated, diversion is achieved by treating part of the zone with acid, then placing a foam to block entry of subsequently injected acid into that part of the zone, and then injecting more acid. These alternating steps may be repeated. The result is complete zonal coverage by the treating fluid and effective damage removal by the acid, even from severely damaged zones. Depending upon the type and concentration of the surfactants used and the foam quality, foams can generate different levels of yield stress. Foamed fluids have also been known to support solid particles and to enhance the stability and viscous flow behavior of fluids. Foamed fluids have also been recognized as one of the best diversion fluids for acid stimulation. Other benefits of foamed fluids are that they are inherently cleaner than non-foamed fluids, even if they contain polymers, because they contain less liquid and that they help kick off flow back and clean up because they provide energy to the system to help overcome resistance, for example the hydrostatic head, to flow back. That they are "energized" is particularly important in depleted reservoirs.

Gelled fluids are used as diverters when they are injected already gelled with a polymer (that may, in addition, be crosslinked) or with a viscoelastic surfactant system. These fluids divert in the same way as do mechanical devices, or chemicals such as salts, by being placed where it is desired to impede the flow.

A new technology, viscoelastic surfactant gel systems, has also been shown to be useful in diverting an acid or a reactive fluid in a new way. In this case, when formulated properly (depending upon the nature and properties of additives and of the surfactant system used), the viscoelastic surfactant fluid is initially acidic and of low viscosity and this fluid then "gels" (increases in viscosity) after the acid in it has spent and the pH increases and thus it temporarily reduces the injectivity of subsequently injected fluids into a zone after stimulating it. These materials (the surfactants in acid) are sometimes known as "viscoelastic diverting acid systems" or "VDA systems" and can be used for fracture stimulation and for acidizing. We will term fluids that have been viscosified with viscoelastic surfactant systems as "gels" or "gelled". These fluid systems exhibit self-diverting behavior as they gel when the acid spends. Typically the viscosity change during acid spending is in the range of 5 to 300 cP (at 170 s−1)_depending on the temperature. Thus, as injected, they have low viscosity and they enter and react with the first reactive matrix material with which they come into contact, but after they react they gel and plug up that region of the formation, forcing subsequently injected fluid to enter a new region of the rock matrix. This is sufficient to give the material self-diverting characteristics. This enables subsequently-injected acid or reactive fluids to further stimulate the other oil or gas zones, or to increase the sweep in water or gas injector wells. After the treatment the diverter gel is destroyed either by flowback fluids or by an internal breaker.

These techniques can be applied in any situation in which it is difficult to contact all of the target matrix. For example, in vertical or deviated wells the target formation could be stratified into layers that have different permeabilities (or different reactivities to the acid or reactive fluid) or the target formation could be so thick (from top to bottom) that for one or more of several reasons it is difficult to contact all of the target in a single treatment. Diversion techniques could also be applicable and necessary in horizontal wells; in such cases, the formation might not be thick but the distance along which a wellbore penetrates the formation may be great, so it would be very difficult for injection of acid made in a single stage to reach the far end of the wellbore penetrating the formation.

Although there are many methods known for acid diversion, they may require expensive and complicated equipment and time-consuming operations if they are mechanical. If they are chemical they may be inefficient and give incomplete zonal coverage, often require many additives, many steps, and large amounts of materials, and then may require time and additional chemical treatments for their removal. Thus there is a need for a simple, inexpensive, fast, reversible method of effective diversion.

SUMMARY OF THE INVENTION

Embodiments of this Invention entail a methodology synergistically combining the characteristics of a self-diverting viscoelastic fluid system with the characteristics of a foamed fluid to generate a more effective and more efficient self-diverting system for acidizing and stimulation treatments, (such as matrix acidizing or acid fracturing (also known as fracture acidizing)). The method of diversion using a fluid in which an initially foamed acid gels as the acid is spent synergistically generates enhanced property changes for improving self-diversion performance during acid stimulation treatments. The method amplifies the viscosity increase during the viscosity change; induces a yield stress change, in addition to a viscosity change; enhances the initial foam stability; improves clean-up of the formation; increases flowback of the stimulation fluid; and enhances the stimulation fluid coverage of multiple zones having varying permeabilities. The foamed self-diverting viscoelastic acidic fluid system is termed a viscoelastic energized diverter system.

One embodiment of the Invention is a method of treating a subterranean formation penetrated by a wellbore with an acid by injecting a viscoelastic energized diverter system and the acid. Optionally these steps may be repeated in alternation. Typically the formation is a carbonate, or a sandstone formation with a carbonate content of greater than about 10 weight percent. The acid may be foamed, gelled, emulsified or retarded and may contain a mutual solvent. The acid may be hydrochloric acid, hydrofluoric acid, formic acid, acetic acid, citric acid, glycolic acid, malonic acid, tartaric acid, and mixtures thereof. Optionally the acid may include monoaminopolycarboxylic acids, polyaminopolycarboxylic acids, salts of monoaminopolycarboxylic acids, salts of monoaminopolycarboxylic acids, polyaminopolycarboxylic acids, esters of monoaminopolycarboxylic acids, esters of monoaminopolycarboxylic acids, mixtures thereof, and mixtures thereof with an acid from the group consisting of hydrochloric acid, hydrofluoric acid, formic acid, acetic acid, citric acid, glycolic acid, malonic acid, tartaric acid, and mixtures thereof. The viscoelastic energized diverter system is foamed, optionally using a surfactant foaming agent, with a gas selected from the group consisting of nitrogen, carbon monoxide, carbon dioxide, a natural gas, or mixtures of one or more of these; preferably the viscoelastic energized diverter system is foamed with carbon dioxide.

The viscoelastic energized diverter system contains a viscoelastic surfactant that has the structure

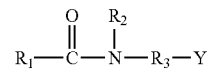

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide. More preferably the surfactant is a betaine having the structure:

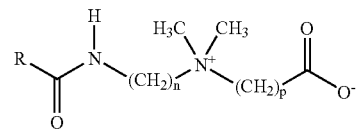

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is a betaine in which R is $C_{17}H_{33}$ or $C_{21}H_{41}$, and n=3 and p=1.

Another embodiment is a method of treating a subterranean formation penetrated by a wellbore involving the steps of injecting a first acid and injecting a viscoelastic energized diverter system comprising a viscoelastic surfactant, a second acid, and a gas. The gas may be injected down tubing and the second acid and the viscoelastic energized diverter system may be pumped in succession through an annulus between tubing and casing. Alternatively, the gas may be injected through an annulus between tubing and casing and the second acid and the viscoelastic energized diverter system may be pumped in succession down tubing. The tubing may be coiled tubing that may be moved into the wellbore during the treatment. Alternatively both the energizing gas and the viscoelastic diverter and the acid may be injected together down tubing or together into an annulus between tubing and casing.

DETAILED DESCRIPTION OF THE INVENTION

Figure 1:
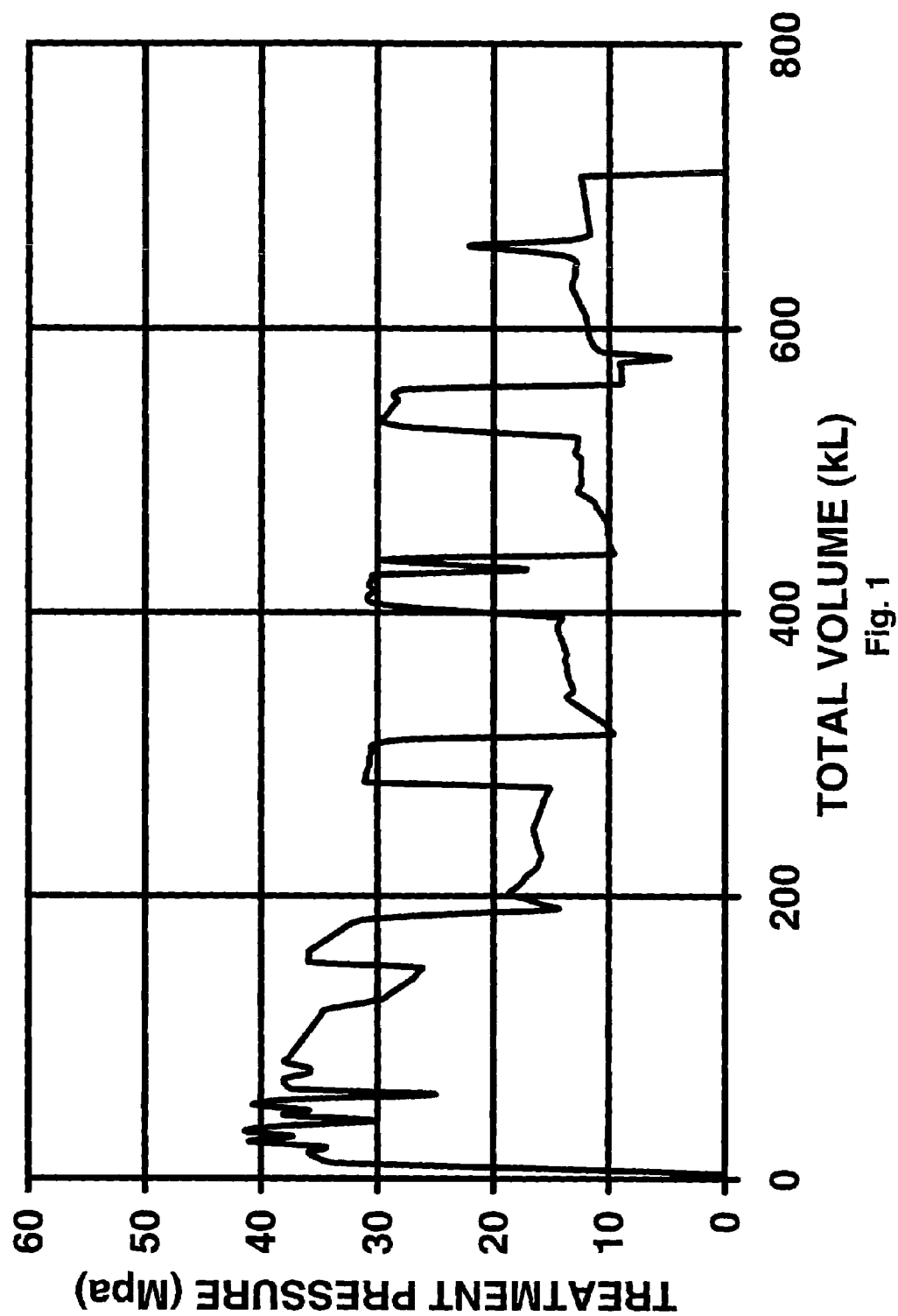
FIG. 1 shows the treating pressure as a function of volume of treating fluid injected for a treatment according to the Invention.

As opposed to foams or already-gelled materials that divert by impeding flow as soon as they are placed, the self-diverting ability of an acid system such as a viscoelastic diverting acid system is due to an in situ increase in viscosity during acid stimulation, and the effectiveness and efficiency of diversion depend upon the magnitude of the viscosity change. In addition, increasing the yield stress of the fluid, for example increasing the yield stress of a foam, has also been shown to be able to increase the flow resistance of a fluid in a porous medium, in tubing and in an annulus.

We have now found a diverting method that not only results in the advantages of each of the unique properties of both foamed and viscoelastic self-diverting fluid systems, but also results in synergistic affects that improve some of the beneficial results of each beyond what would be expected. This method of diverting acidic or reactive matrix treatment fluids or fracturing fluids uses an energized gas to energize and/or foam an acidic fluid containing a viscoelastic surfactant system to make the diverting fluid. We will call the fluid used in embodiments of the Invention a "Viscoelastic Energized Diverter system" or "VED system". A VED system is a foamed fluid in which the continuous phase is aqueous and contains a viscoelastic surfactant system and an acid, and the viscosity of the aqueous phase is water-like or nearly water-like when the foamed fluid is formed but increases if the acid reacts.

Although we have used and will use the term "foam" throughout this discussion, it should be understood that the energizing fluid need not necessarily be a gas under the conditions in which the "foam" is made or used. For example, the energizing fluid may be carbon dioxide and may be above either its critical temperature or its critical pressure or both, so it may be a gas, a liquid or a supercritical fluid. [Strictly speaking, a system is a dispersion when particles of any nature (e.g. solid, liquid, supercritical fluid, or gas) are dispersed in a continuous, or external, phase of a different composition (or state). A foam is a dispersion in which a significant proportion, by volume, of a phase in the form of bubbles (the internal, dispersed or discontinuous phase), is dispersed in a liquid, solid or gel, and the bubbles are separated from one another by lamellae of the continuous phase between them. Thus in these systems if the gas is condensed or supercritical the fluid would more properly be called a dispersion, but we will use the more common oilfield terms "foam" for the fluid and "gas" for the dispersed phase.] A fluid is called "energized" if the dispersed phase is a condensed phase or a gas that will expand when the pressure is reduced, or when the temperature is increased, and, for example, thus increases the driving force for flow. A fluid, is typically called a foam when it contains from about 52 percent dispersed phase (below which the bubbles do not all touch one another) to about 96 volume percent dispersed phase (above which it is called a mist). When it contains less than about 52 percent dispersed phase the fluid may be called "energized" in the oilfield; energized fluids typically contain at least about 10 percent dispersed phase in the oilfield. Foams can divert, as can energized fluids containing sufficient "gas" to have a dispersed phase and a continuous phase and thus significantly increased viscosity and resistance to flow, but even fluids that do not divert are still beneficial because they can enhance flow back and clean up.

The foaming agents for the VED system are preferably surfactants that can form VDA fluid systems, that is surfactants that maintain low viscosity when dispersed in acidic fluids but generate viscoelastic gels during or after acid spending. That is, the same surfactant is normally used to form the VDA system and the foam. However, it is within the scope of embodiments of the Invention to use a mixture of surfactants in order to achieve the most desirable combination of foaming and VDA system effects. All may be VDA system forming surfactants or one or more may be foam-formers only. A "foaming aid" or "co-surfactant" may be added to the fluid to enhance the stability of the foam, especially at higher temperatures and higher salinities. Examples of such foam stability aids are ethoxylated surfactants and alpha-olefin surfactants; such materials are well known to those of skill in the art. (Not to be limited by theory, but it is believed that the stability of VED systems is already higher than the stability of similar foams made without the VES system in the fluid, because of the higher viscosity of the aqueous fluid making up the continuous external phase.). Properties of fluids made with surfactant mixtures can readily be determined by simple laboratory experiments to ensure that combinations of surfactants provide all the needed fluid properties and behavior and are compatible with the intended use, providing no undesirable properties or behavior.

The internal phase of the foamed VED fluid system is a gas, condensed gas, or supercritical fluid (all of which will be termed gases in this document). The preferred gases are nitrogen, carbon monoxide, carbon dioxide, a natural gas, or mixtures of one or more of these gases. Carbon dioxide is a most preferred gas, especially in low-pressure wells. The external phase of the foamed VED fluid system is preferably an acidic fluid applicable for stimulation of a hydrocarbon-containing reservoir. Specific acids are chosen according to well-known guidelines depending upon the nature of the rock formation and its contaminants, the compatibility of the acid with the other components of the fluid and with other materials with which the fluid may come into contact, the compatibility of the acid and the byproducts of the reactions of the acid with other materials present, and other aspects of the job such as the temperature and injection rates. However, the choice of the nature of and the concentration of the acid is also particularly dependent upon the ability of the VED system to form a foam and to undergo the appropriate viscosity increase when the acid is spent. Preferably, the acid is hydrochloric acid.

The volume percent carbon dioxide ("quality") in the fluid is preferably in the range of from about 30 to about 90 percent gas (or supercritical fluid) by volume. In general, the higher the foam quality the more effective the diversion. The optimal foam quality, which yields the optimal diversion performance, depends upon the nature of the fluid used as the internal phase (energizer), the temperature and pressure of application, the flow rates of the VED system and of the stimulation acid, and the porosity of the rock formation. Even if the quality is low, there are still benefits from the fluid being energized. In fact, an energized fluid may have a lower viscosity than a foamed fluid, resulting in enhanced fluid system flowback and thus enhanced clean-up after the treatment. This enhanced clean-up leads to a higher retained permeability of the formation after the treatment, resulting in greater production from the hydrocarbon-bearing treated formation.

Non-limiting examples of appropriate viscoelastic surfactants useful in making viscoelastic surfactant gel systems, VDA systems, and VED systems, can be found in U.S. Pat. No. 6,482,866, U.S. Pat. No. 6,435,277, and U.S. patent application Ser. No. 2002/0023752, all of which are hereby incorporated in their entirety, and all of which are assigned to the same assignee as the present Invention. These materials (the surfactants in acid) are known as "viscoelastic diverting acid systems" or "VDA systems". They may also contain co-surfactants, salts, low-molecular weight alcohols, especially methanol, and other additives to enhance viscosity and stability, as described in the above references.

Additionally, since they are acids that will be in contact with metal components of the well, they should contain corrosion inhibitors; they may also contain other appropriate oilfield fluid additives such as iron control additives, antioxidants, anti-sludge agents, high temperature inhibitors, non-emulsifying agents, chelating agents, and scale inhibitors. Compatibility and suitability of additives should be tested, as discussed below. Although they are actually low-viscosity materials when injected, and gel as the acid is spent, the materials as injected are often called gels. (The same surfactants can be formulated into fluids that are initially gels as mixed at the surface if the other components are formulated differently, especially if the strong acid is not included.) Viscoelastic surfactant gel systems (such as VDA systems) have been recognized as among the best diversion fluids for acid stimulation (matrix acidizing) and as being able to control wormholing and etching of carbonate formations during fracture stimulation (acid fracturing or fracture acidizing).

Preferred surfactants have the following amide structure:

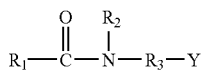

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide. More preferably the surfactant is a betaine having the structure:

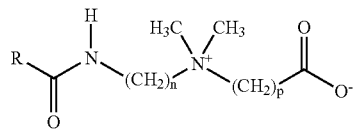

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is the betaine in which R is $C_{17}H_{33}$ or $C_{21}H_{41}$, and n=3 and p=1; these are called BET-O-30 and BET-E-40 respectively.

As non-limiting examples, BET-O-30 and BET-E-40 zwitterionic surfactants have been found to be particularly useful in forming VDA systems. BET-O-30 is so designated because as obtained from the supplier (Rhodia, Inc. Cranbury, N.J., U.S.A.) it is called Mirataine BET-O-30 because it contains an oleyl acid ester group (including a $C_{17}H_{33}$ tail group) and contains about 30% active surfactant; the remainder is substantially water, a small amount of sodium chloride, and isopropanol. The analogous material, BET-E40, is also available from Rhodia and contains a erucic acid ester group (including a $C_{21}H_{41}$ tail group) and is 40% active ingredient, with the remainder again substantially water, a small amount of sodium chloride, and isopropanol. The surfactants are supplied in this form, with an alcohol and a glycol, to aid in solubilizing the surfactant in water at these high concentrations, and to maintain it as a homogeneous fluid at low temperatures. In field use, after dilution, the amounts of the other components of the as-received materials are insignificant. BET surfactants, and others, are described in U.S. Pat. No. 6,482,866.

The foamed self-diverting fluids improve diversion/stimulation effectiveness in, for example, highly fissured reservoirs, multi-layer reservoirs having a high permeability contrast, thick reservoirs, and deviated or horizontal wellbores penetrating reservoirs. Increasing diversion efficiency allows the use of smaller volumes of the diversion fluid. Furthermore, the self-diverting gel is the external phase spreading around the gas bubbles forming the internal phase. The surface area of the gel phase thus is increased dramatically because the system has a foam structure. This enables much more efficient contact of the gelled material with produced hydrocarbon or with a solvent, such as a mutual solvent or diesel, from a solvent preflush. VDA systems enhanced viscosities are destroyed by disruption of the micelles by contact with many other fluids. Aqueous fluids destroy the micelles either by diluting the surfactant or in some cases by changing the ionic strength of the aqueous phase. Hydrocarbon fluids also destroy the micelles by disrupting their structure. Materials, such as but not limited to mutual solvents, such as but not limited to glycols like ethylene glycol monobutyl ether, may in fact be injected so that they will contact the VDA system and destroy it at the appropriate time. For example, a mutual solvent may be injected before the VDA system is injected so that during flowback the mutual solvent will break the VDA system. The destruction of the micelles dramatically reduces the viscosity of the VDA system which then allows flow of fluids into the previously blocked regions and greatly enhances wellbore clean-up, in particular meaning that only low pressures are required for well clean-up, resulting in simplified operations and reduced clean-up costs. Furthermore, since the diverter fluid is a foam, it is less dense than an unfoamed fluid; it therefore contributes less to the hydrostatic head during clean up. The lower hydrostatic head and the energizing both facilitate clean up.

The main acid treatment ("acidic fluid") that is alternated with the VED system, can be any of many oilfield acids commonly used in matrix stimulation and acid fracturing, provided only that they are compatible with the VED system. Such acids include conventional acids or gelled acids, retarded acids, delayed acids, or emulsified acids. They typically must include corrosion inhibitors. Gelled acids are typically gelled with polymers (such as xanthan gum, N,N-bis(2-hydroxyethyl)tallowamine acetate, and acrylamide polymers and copolymers. Emulsified acids are typically in the internal aqueous phase of water-in-oil emulsions in which the oil is commonly diesel and/or kerosene and the emulsifying agent may be, among other options, a tall oil acid diethanolamide, or cocoalkyl amines and acetates. Acids may also be delayed or retarded by encapsulation, by chemical reaction, by using acid precursors, of by using buffers that change with time and/or temperature. All of these methods are well known in the art. Typical specific acid components of these acidic fluids include hydrochloric acid, hydrofluoric acid, formic acid, acetic acid, citric acid, glycolic acid, malonic acid, tartaric acid, and mixtures of these. The acidic fluid is chosen so that the rate and extent of reaction with the formation rock matrix are appropriate. The most common acid concentrations, for example for hydrochloric acid, are 5%, 15%, 20% and 28%.

Other matrix rock dissolving materials may be used, and are considered "acidic fluids" or "acids" for the purposes of this discussion. Such materials are, for example chelating agents such as aminocarboxylic acids, polycarboxylic acids, polyaminocarboxylic acids, and polyaminopolycarboxylic acids, their esters (or other condensation products) and salts, and mixtures of the acids, esters or salts. These are typically mixed with a mineral acid such as hydrochloric acid. Some such matrix dissolving materials are known to adversely affect VDA systems or VED systems under certain conditions, depending upon the temperature, the intended duration of use, the nature and concentration of the surfactant, and the nature and concentration of the matrix dissolving material. Thus when such materials, or in fact any additives, are to be included in the VDA fluid system, or used with the VDA fluid system, tests must be performed to ensure that they do not adversely affect the VDA system or VED system by causing the VDA system to gel too soon, causing the VDA system not to gel when the acid is spent, causing the viscosity of the VDA system after gellation to be inadequate, causing the yield stress of the VED system to be inadequate, or decreasing the useful lifetime of the VED system by decreasing the stability of the foam or of the micelles. Such testing for compatibility and suitability of additives is typical for fluids used in oilfield treatments.

If it is found that it would be desirable or necessary to ensure that the VED and/or VDA system and the acidic fluid do not interact, because, for example, they would form a precipitate or one would break the other, it is within the scope of embodiments of the Invention to include a spacer between the systems to be kept apart. Non-limiting examples of such a spacer are a brine and a polymer-containing fluid. If the only undesirable interaction is that one component breaks another but no damage would be done to the formation, the job may be designed so that there is a sufficient extra amount of either or both fluids so that some of either or both is sacrificed when the breaking occurs but there is enough remaining so that the job proceeds as desired.

Most commonly, the "acid" is injected first, then the VED system, then another acid stage. Very frequently this is followed by one or more additional sequences of diverter and acid. It is also common in acid treatments to use preflushes, spacers, mutual solvents, post flushes, and other fluids in conjunction with the main acid treatments and the diverters. These various fluids are used to keep injected fluids, injected fluid byproducts or reaction products, connate fluids, produced fluids, etc., from contacting one another if undesirable interactions would occur. Mutual solvents may also be used to break viscoelastic surfactant gel systems. A non-limiting example is ethylene glycol monobutyl ether. It is within the scope of embodiments of the Invention and well known to those of skill in the art to employ such additional fluids in additional stages in embodiments of the Invention. Again, the additives must be tested for suitability and compatibility. In this case, the consequences of possible contact or mixing of fluids in successive stages should also be tested in the laboratory, as would be recognized by operators skilled in the art, to ensure that the desire results are obtained and undesired reactions/interactions do not occur.

Although energizing of fluids, such as acids, is normally performed in low-pressure wells in order to increase otherwise undesirably low flow rates during flowback, the synergistic effect noted by using foamed VDA systems as diverting agents makes the use of energized fluids more attractive at higher pressures, because they can improve diversion and clean-up.

The construction and completion of the well can be by any method used in the art. For example, the wellbore may be open hole or cased, or it may be a single or multiple completion. Any conventional nozzles and completion or stimulation bottom hole assemblies normally used for energized or foamed fluids may be used. Treatments are designed and carried out in conventional ways, typically using commercially available treatment design, execution, and evaluation software and commercially available field equipment. The energizing fluid (gas) is normally mixed with the VDA system downhole rather than at the surface, because the resulting VED system may have a greater friction pressure than either fluid alone, and so the VED system could require more hydraulic horsepower to inject. (Minimization of friction pressure is particularly important in slim holes, when coiled tubing is used, and in very deep wells.) However, the mixing could be done at or near the surface if desired. Normally, the fluid that has the lower friction pressure is preferably injected down the annulus, which has a greater surface area. Injection of the energizing fluid (gas) is normally continued throughout the job, but it could be omitted during any of the stages, provided that at least one of the VDA system stages is mixed with an energizing fluid to form a VED system. Furthermore, an amount of gas can be included in the injected VDA and/or acid systems in order to reduce their friction pressures. Those with skill in formulating and pumping liquids, emulsions, foams and energized fluids will know best how to minimize the total friction pressure for a given selection of fluids and well configuration.

Other measures may also be used to improve zonal coverage, especially in very long reservoir intervals. For example, the tubing (either coiled tubing or completion tubing) may be perforated at intervals to improve the distribution of injected fluids. As another example, one or more mechanical isolators may be used to isolate one or more portions of the long zone to be treated, so that the treatment can be done in stages. Examples of mechanical isolators are cup tools and packers, which can be used individually or in combination. For example 3000 meters of wellbore penetrating a formation may be isolated by a packer, a cup tool or both at 300 meter intervals to separate the job into ten stages. Perforated tubing may be used in conjunction with mechanical isolation.

Embodiments of the Invention have been described for hydrocarbon-producing wells. However, embodiments of the Invention are also applicable to injection wells (for example for storage, disposal, or enhanced production) or for production wells for other products such as water, helium or carbon dioxide.

EXAMPLE I

The results of foaming of a VDA fluid system were determined. An aqueous VDA fluid system was made according to U.S. patent application Ser. No. 2002/01327541, containing HCl, and BET-E-40, (a betaine surfactant available from Rhodia, Inc. Cranbury, N.J., U.S.A. that contains a erucic acid ester group (including a $C_{21}H_{41}$ tail group) and is 40% active ingredient, with the remainder substantially water, a small amount of sodium chloride, and isopropanol). The VDA system formulation was as follows:
15% (by volume) Hydrochloric Acid to contain per 1000 Liters (L)
6 L Corrosion Inhibitor
50 L BET-E-40
0.6 kg Iron Reducing Agent 5 L Iron Chelating Agent
2 L Non Emulsifier
10 L Methanol The viscosity of this fluid was measured at room temperature and atmospheric pressure in a Fann 35 and found to be about 5 cP. A portion of this material was then foamed with air; it was estimated by the volume increase that the foam contained about 10 volume % air. The viscosity of this foam was measured at room temperature and atmospheric pressure in a Fann 35 and found to be about 50 cP. (This was a laboratory experiment done at atmospheric temperature and pressure and the foam "quality" (the volume per cent gas in the foam) was lower than is used in diverter fluids of embodiments of the Invention. This is not a foam quality that would preferably be used in embodiments of the Invention, but rather is a foam quality that could be made in the laboratory to demonstrate the effects that are obtained using fluids of embodiments of the Invention.) Clearly the VDA system could be foamed to make a VED system and the VED system had a much higher viscosity than did the VDA system.

EXAMPLE 2

An acid fracturing field test was performed using a gelled acid, a VDA self-diverting acid system and $CO_2$. The job design is shown in Table 1 below:

| Stage # | Type | Fluid | Stage Liq. Vol. (L) | $CO_2$ Vol (L) | Stage Time (min) |
|---|---|---|---|---|---|
| 1 | Pad | 1.2 g/L Guar | 75700 | 50500 | 11.3 |
| 2 | Acid | MS GA | 30300 | 20200 | 4.5 |
| 3 | Diversion | VDA | 37900 | 25200 | 5.7 |
| 4 | Acid | Reg GA | 56800 | 37900 | 8.5 |
| 5 | Acid | MS GA | 30300 | 20200 | 4.5 |
| 6 | Diversion | VDA | 37900 | 25200 | 5.7 |
| 7 | Acid | Reg GA | 56800 | 37900 | 8.5 |
| 8 | Acid | MS GA | 30300 | 20200 | 4.5 |
| 9 | Diversion | VDA | 37900 | 25200 | 5.7 |
| 10 | Acid | Reg GA | 56800 | 37900 | 8.5 |
| 11 | Acid | MS GA | 30300 | 20200 | 4.5 |
| 12 | Diversion | VDA | 37900 | 25200 | 5.7 |
| 13 | Acid | MS GA | 30300 | 20200 | 4.5 |
| 14 | Acid | Reg GA | 56800 | 37900 | 8.5 |
| 15 | Overflush | 4.8 g/L Guar | 56800 | 37900 | 8.5 |
| 16 | Flush | 4.8 g/L Guar | 56800 | 37900 | 8.5 |
| Totals | | | 719300 | 479500 | 107.7 |

Table 1

The job was started with a pad of 1.2 g/L aqueous guar, followed by a gelled main treating acid containing a mutual solvent, followed by a VDA diverter system (that became a VED system upon mixing with the $CO_2$), followed by a regular gelled main treating acid, followed by a gelled main treating acid containing mutual solvent, and followed by additional sequences that are detailed in Table 1. Each of the acid and diverter stages contained 15% by volume hydrochloric acid. Note that in the last sequence, the first gelled main treating acid stage contained the mutual solvent and the second gelled main treating acid stage did not. The treatment was then completed with an overflush and a flush.

The compositions of the actual fluids used are shown in Table 2:

TABLE 2

| | | |
|---|---|---|
| Reg GA | 15% Regular Gelled Hydrochloric Acid to contain per 1000 Liters: | 3 L Corrosion Inhibitor<br>4 L Surfactant (Wettability Modifier)<br>2 L Non Emulsifier<br>0.6 kg Iron Reducing Agent<br>5 L Chelating Agent<br>5 L Acid Gelling Agent |
| MS GA | 15% Gelled Hydrochloric Acid with Mutual Solvent to contain per 1000 Liters: | 3 L Corrosion Inhibitor<br>4 L Surfactant (Wettability Modifier)<br>2 L Non Emulsifier<br>0.6 kg Iron Reducing Agent<br>5 L Chelating Agent<br>5 L Acid Gelling Agent<br>50 L Mutual Solvent |
| VDA | 15% VDA Hydrochloric Acid to contain per 1000 Liters: | 6 L Corrosion Inhibitor<br>50 L BET-E-40<br>0.6 kg Iron Reducing Agent<br>5 L Iron Chelating Agent<br>2 L Non Emulsifier<br>10 L Methanol |
| Pad | Pad and Flushes:<br>(1.2 g/L guar) to contain per 1000 Liters: | 2.3 L Slurried Guar Gel<br>4.5 g Biocide<br>0.0125 L Enzyme Breaker<br>4 L Surfactant (Wettability Modifier) |
| Flush | (4.8 g/L guar) to contain per 1000 Liters: | 9.2 L Slurried Guar Gel<br>4.5 g Biocide<br>0.0125 L Enzyme Breaker<br>4 L Surfactant (Wettability Modifier) |

Liquid $CO_2$ was pumped through the tubing down to an open-hole horizontal wellbore at a depth of about 3650 meters; the pad, gelled acid, VDA self-diverting acid system, and flushes were pumped in succession through the annulus between the casing and the tubing. An approximately 40% quality "foam" was generated down-hole and this was maintained throughout the pad, the acid and diverter stages, and the flushes. In this case the tubing was a dead string and the tubing and casing ended at the beginning of the open hole horizontal section. The formation temperature was about 93° C.

The treatment therefore involved pumping a gelled acid as the main stimulation fluid and a self-diverting acid system ("VDA" in the Tables) as the diverter in 4 stages for achieving complete zonal coverage of the 1220 meters of horizontal wellbore. Where the VDA system contacted the $CO_2$ downhole, it formed the VED system. Shown in FIG. 1 is the liquid (gelled acid or VDA system) treating pressure, in MPa, as observed at the surface during the treatment vs. the volume pumped, in kL. The liquid was injected at a constant flow rate of about 6.68 kL per minute; as the pressure changed, due to diversion as the liquid was switched back and forth between gelled acid and VDA system, the $CO_2$ injection rate was varied slightly from the intended rate of about 4.45 kL per minute to keep the total pressure approximately constant.

As can be seen from FIG. 1, the change in pressure induced by the foamed self-diverting acid during stimulation was exceptionally high. The second stage yielded a pressure change from about 15.9 MPa to about 31.0 MPa which represents an unexpectedly large gain of more than 15 MPa. The dramatic increase and then decrease in treating pressure shows that after the VED system gelled there was great resistance to flow and that when the injected fluid was switched from VED system to main treating acid the main treating acid easily entered the formation so it must have been following a new route and entering a previously uncontacted zone or zones of the formation. Subsequent stages showed that this result was obtained repeatedly, indicating that the sequence of injecting main treating acid and then VED diverter system could be repeated until complete zonal coverage was achieved. Not to be limited by theory, but it is believed that the dramatic increase in treating pressure could not be accounted for by only the increase in viscosity of the liquid phase of the foam, and the additional increase is attributed to an increase in the yield stress of the foam as well.

EXAMPLE 3

In an unfoamed self-diverting acid fracturing treatment, a much smaller pressure change was observed. A field test was performed using an emulsified acid ("SXE" in the Table) and a VDA self-diverting acid system ("VDA" in the Table) without energizing. The job design is shown in Table 3:

TABLE 3

| Stage # | Fluid | Stage Liq. Vol. (L) |
|---|---|---|
| 1 | 1.2 g/L Guar | 5691 |
| 2 | 20% Acid | 9459 |
| 3 | VDA | 22717 |
| 4 | SXE | 37867 |
| 5 | 1.2 g/L Guar | 11335 |
| 6 | VDA | 22749 |
| 7 | SXE | 45402 |
| 8 | 1.2 g/L Guar | 26580 |
| 9 | VDA | 22701 |
| 10 | SXE | 37867 |
| 11 | 1.2 g/L Guar | 11335 |
| 12 | VDA | 22733 |
| 13 | SXE | 45402 |
| 14 | 1.2 g/L Guar | 26643 |
| 15 | VDA | 22669 |
| 16 | SXE | 37851 |
| 17 | 1.2 g/L Guar | 11366 |
| 18 | VDA | 22701 |
| 19 | SXE | 45465 |
| 20 | 1.2 g/L Guar | 26564 |
| 21 | VDA | 22733 |
| 22 | SXE | 37819 |
| 23 | 1.2 g/L Guar | 11398 |
| 24 | VDA | 22669 |
| 25 | SXE | 45434 |
| 26 | 1.2 g/L Guar | 26564 |
| 27 | VDA | 22701 |
| 28 | SXE | 37867 |
| 29 | 1.2 g/L Guar | 13830 |
| 30 | VDA | 25817 |
| 31 | SXE | 56021 |
| 32 | 1.2 g/L Guar | 89659 |
| Total | | 927606 |

The job was started with a pad of 1.2 g/L aqueous guar, followed by a stage of "slick acid", followed by a VDA diverter system stage, followed by a stage of emulsified main treating acid, followed by a stage of 1.2 g/L aqueous guar, followed by a VDA diverter system stage, followed by a stage of emulsified main treating acid, and followed by additional sequences that are detailed in Table 3. Each of the diverter and acid stages contained about 20% by volume hydrochloric acid in the aqueous portion (so that the guar and VDA system stages contained about 20% acid but the emulsified main treating acid stages contained about 14% acid based on total liquid (aqueous phase plus oil phase).

The treatment was then completed with an overflush. Each of the fluids contained other additives in minor amounts typical of oilfield fluids.

The compositions of the actual fluids used are shown in Table 4:

TABLE 4

| 1.2 g/L Guar | per 1054 Liters: |
|---|---|
| SLURRIED GUAR GEL | 2.25 L |
| MICROBIOCIDE | 0.017 g |
| BREAKER | 0.12 g |
| NONEMULSIFYING AGENT | 2.00 L |
| MUTUAL SOLVENT | 50 L |

| Slick Acid | per 1010 Liters: |
|---|---|
| 20% HCl | 1000 L |
| ACID GELLING AGENT | 2.00 L |
| CORROSION INHIBITOR | 1.00 L |
| NONEMULSIFYING AGENT | 2.00 L |
| INHIBITOR AID | 0.24 g |
| REDUCING AGENT | 5.00 L |

| SXE | per 1022 Liters: |
|---|---|
| CORROSION INHIBITOR | 2.00 L |
| 20% HCl | 700.00 L |
| EMULSIFYING AGENT | 10.00 L |
| DIESEL OIL | 300.00 L |
| CHELATING AGENT | 10.00 L |

| VDA | per 1074 Liters: |
|---|---|
| 20% HCl | 1000 L |
| AS-RECEIVED BET-E-40 | 50.00 L |
| HIGH TEMPERATURE INHIBITOR | 2.00 L |
| NON-EMULSIFYING AGENT | 2.00 L |
| CHELATING AGENT | 10.00 L |
| METHANOL | 10.00 L |

This job was pumped through about 100 meters of perforated, approximately horizontal, casing into a formation at a depth of about 3475 meters at a treatment pressure of about 50 MPa, a temperature of about 88° C., and an average injection rate of about 3.5 kL/min. The treatment therefore involved pumping an emulsified acid as the main stimulation fluid and a self-diverting acid system (VDA) as the diverter in 10 stages.

Figure 2:
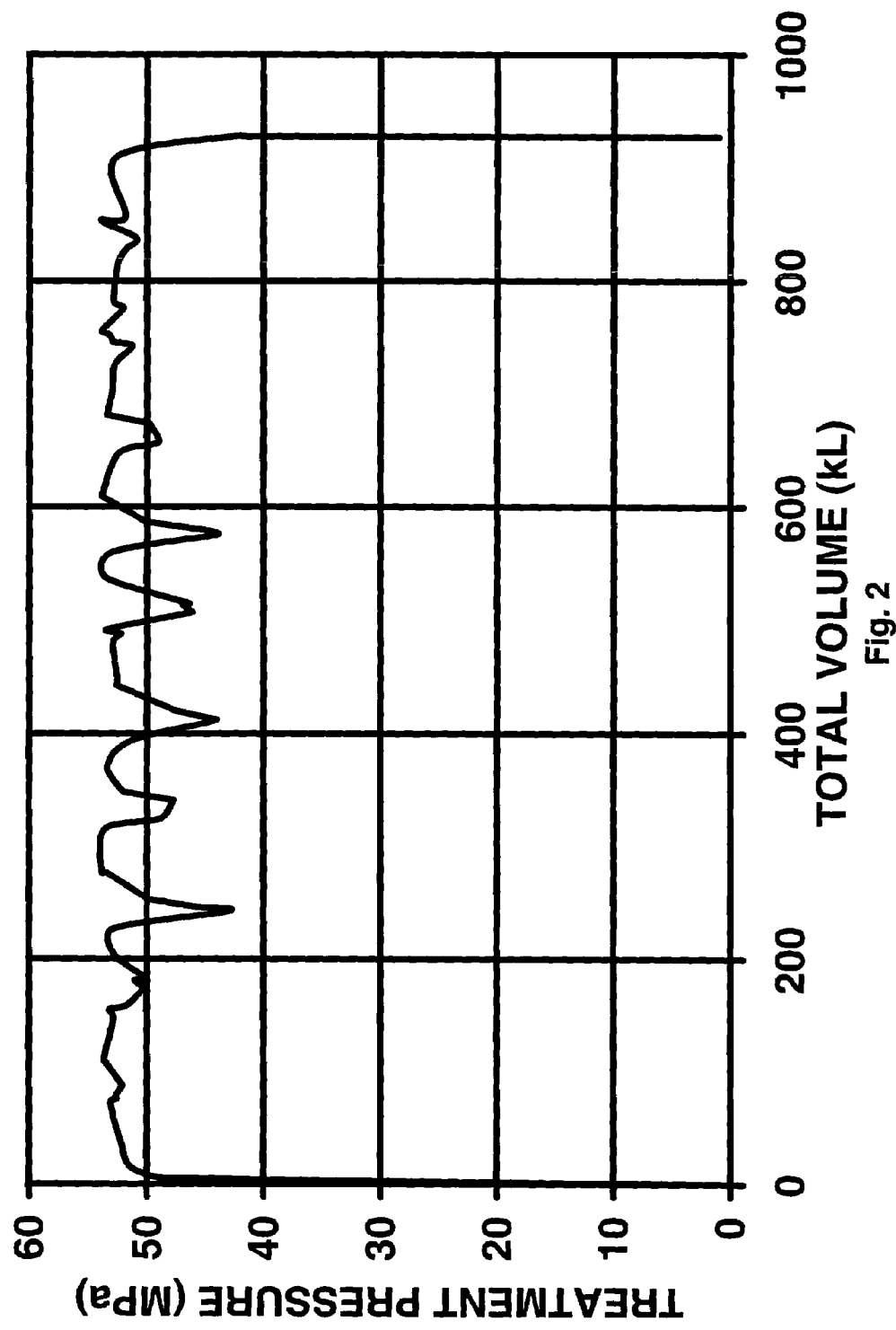
FIG. 2 shows the treating pressure as a function of volume of treating fluid injected for a treatment with a diverter not suitable for the Invention.

Shown in FIG. 2 is the liquid (pad, emulsified acid or VDA system) treating pressure, in MPa, as observed at the surface during the treatment vs. the volume pumped, in kL. As can be seen from FIG. 2, the change in pressure induced by the unfoamed self-diverting acid during stimulation was much less than that observed in the method of the Invention shown in FIG. 1. The job was a success, but 10 stages were required to achieve zonal coverage, and the pressure changes from some of the stages were small.

What is claimed:

1. A method of treating a subterranean formation penetrated by a wellbore with a first acid comprising the steps of:
   a. injecting an aqueous viscoelastic energized diverter system that comprises a second acid and that increases in viscosity as the second acid is consumed by reaction with the formation, and
   b. injecting the first acid,
   wherein the first acid is gelled.

2. A method of treating a subterranean formation penetrated by a wellbore with a first acid comprising the steps of:

a. injecting an aqueous viscoelastic energized diverter system that comprises a second acid and that increases in viscosity as the second acid is consumed by reaction with the formation, and b. injecting the first acid, wherein the first acid is emulsified.

3. A method of treating a subterranean formation penetrated by a wellbore with an acid comprising the steps of:

a. injecting a viscoelastic energized diverter system, and b. injecting the acid, wherein the acid is selected from the group consisting of monoaminopolycarboxylic acids, polyaminopolycarboxylic acids, salts of monoaminopolycarboxylic acids, salts of polyaminopolycarboxylic acids, esters of monoaminopolycarboxylic acids, esters of polyaminopolycarboxylic acids, mixtures thereof, and mixtures thereof with an acid from the group consisting of hydrochloric acid, hydrofluoric acid, formic acid, acetic acid, citric acid, glycolic acid, malonic acid, tartaric acid, and mixtures thereof.

4. A method of treating a subterranean formation penetrated by a wellbore with a first acid comprising the steps of:

a. injecting a viscoelastic energized diverter system comprising a viscoelastic surfactant, a second acid, and a gas, and b. injecting the first acid.

5. The method of claim 4 wherein the two steps are repeated in alternation.

6. The method of claim 4 wherein one or both of the steps is conducted above the fracturing pressure of the formation.

7. The method of claim 4 wherein the gas is injected down tubing and the second acid and the viscoelastic energized diverter system are pumped in succession through an annulus between tubing and casing.

8. The method of claim 7 further wherein the second acid and the viscoelastic energized diverter system further comprise a gas.

9. The method of claim 7 wherein the tubing is perforated.

10. The method of claim 7 wherein the tubing is coiled tubing.

11. The method of claim 10 wherein the coiled tubing is moved into the wellbore during the treatment.

12. The method of claim 4 wherein a mechanical isolator is employed.

13. The method of claim 4 wherein the gas is injected through an annulus between tubing and casing and the second acid and the viscoelastic energized diverter system are pumped in succession down tubing.

14. The method of claim 13 further wherein the second acid and the viscoelastic energized diverter system further comprise a gas.

15. Method of claim 13 wherein the tubing is perforated.

16. The method of claim 13 wherein the tubing is coiled tubing.

17. The method of claim 16 wherein the coiled tubing is moved into the wellbore during the treatment.

* * * * *